(12) United States Patent
Suyderhoud et al.

(10) Patent No.: US 11,454,521 B2
(45) Date of Patent: Sep. 27, 2022

(54) MAGNETIC FIELD SENSOR WITH AN ADJUSTABLE THRESHOLD

(71) Applicant: Allegro MicroSystems, LLC, Manchester, NH (US)

(72) Inventors: Philip Suyderhoud, Manchester, NH (US); Logan G. Stewart, Merrimack, NH (US); Steven E. Snyder, New Boston, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 176 days.

(21) Appl. No.: 17/060,235

(22) Filed: Oct. 1, 2020

(65) Prior Publication Data

US 2022/0107207 A1   Apr. 7, 2022

(51) Int. Cl.
G01D 5/14        (2006.01)
G01P 13/00       (2006.01)

(52) U.S. Cl.
CPC ............. G01D 5/145 (2013.01); G01P 13/00 (2013.01)

(58) Field of Classification Search
CPC ............................... G01D 5/145; G01P 13/00
See application file for complete search history.

(56) References Cited

U.S. PATENT DOCUMENTS

| | | |
|---|---|---|
| 5,650,719 A | 7/1997 | Moody |
| 5,917,320 A | 6/1999 | Scheller |
| 6,297,627 B1 | 10/2001 | Towne et al. |
| 7,053,674 B1 | 5/2006 | Romero et al. |
| 7,199,579 B2 | 4/2007 | Scheller et al. |
| 7,362,094 B2 | 4/2008 | Voisine et al. |
| 8,058,864 B2 | 11/2011 | Scheller et al. |
| 8,089,270 B2 | 1/2012 | Scheller et al. |
| 8,723,512 B1 | 5/2014 | Burdette et al. |
| 8,736,260 B2 | 5/2014 | Foletto et al. |
| 9,329,057 B2 | 5/2016 | Foletto et al. |
| 9,395,391 B2 | 7/2016 | Fernandez et al. |
| 9,476,899 B2 | 10/2016 | Fernandez et al. |
| 9,778,326 B2 | 10/2017 | Chen et al. |
| 9,797,961 B2 | 10/2017 | Feucht et al. |

(Continued)

OTHER PUBLICATIONS

Allegro MicroSystems, LLC Datasheet A1696PUC "Position Sensor IC with Speed and Direction Output", May 13, 2020, 17 pages.

*Primary Examiner* — Clayton E. LaBalle
*Assistant Examiner* — Michael A Harrison
(74) *Attorney, Agent, or Firm* — Daly, Crowley, Mofford & Durkee, LLP (57) ABSTRACT

A magnetic field sensor for detecting motion of an object includes one or more magnetic field sensing elements configured to generate a magnetic field signal in response to a magnetic field associated with the motion of the object and a detector responsive to the magnetic field signal and to a threshold signal and configured to generate a comparison signal having edges occurring in response to a comparison of the magnetic field signal to the threshold signal. A threshold generator is configured to generate the threshold signal at a first level when a peak-to-peak value of the magnetic field signal is greater than a first predetermined value and at a second level when the peak-to-peak value of the magnetic field signal is less than a second predetermined value different than the first predetermined value.

18 Claims, 8 Drawing Sheets

(56) References Cited

U.S. PATENT DOCUMENTS

| | | |
|---|---|---|
| 9,970,996 B2 | 5/2018 | Fernandez et al. |
| 10,921,341 B2 | 2/2021 | Fernandez |
| 2015/0260803 A1* | 9/2015 | Chen .................. G01R 33/0029 324/252 |

* cited by examiner

MAGNETIC FIELD SENSOR WITH AN ADJUSTABLE THRESHOLD

CROSS REFERENCE TO RELATED APPLICATIONS

Not Applicable.

STATEMENT REGARDING FEDERALLY SPONSORED RESEARCH

Not Applicable.

FIELD

This disclosure relates generally to magnetic field sensors, and, more particularly, to magnetic field sensors and related techniques for adjusting a threshold signal in a magnetic field sensor to increase operational air gap range.

BACKGROUND

As is known, magnetic field sensors are used in a variety of applications. One example application is in motion (e.g., rotation) detectors where a magnetic field sensor is used to detect motion of an object, such as a ferromagnetic object, for example, a gear or ring magnet. In motion detectors, the magnetic field associated with the object is typically detected by one or more magnetic field sensing elements, such as a Hall effect element or a magnetoresistance element, which provides a signal (i.e., a magnetic field signal) proportional to a detected magnetic field.

The magnetic field signal is compared to a threshold signal to generate an output signal that changes state when the magnetic field signal crosses the threshold signal. In one type of magnetic field sensor, sometimes referred to as a peak-to-peak percentage detector, the threshold signal is equal to a percentage of the peak-to-peak magnetic field signal. In another type of magnetic field sensor, sometimes referred to as a slope-activated or peak-referenced detector, threshold levels differ from the positive and negative peaks (i.e., the peaks and valleys) of the magnetic field signal by a predetermined amount. Thus, in this type of magnetic field sensor, the output signal changes state when the magnetic field signal comes away from a peak or valley of the magnetic field signal by the predetermined amount.

Some motion detectors generate an output signal indicative of the speed of motion of the object. Other motion detectors generate an output signal indicative of a direction of motion of the object as well. Magnetic field sensors are often used to detect gear features, such as gear teeth and/or gear slots. A magnetic field detector in this application is commonly referred to as a "gear tooth sensor." Gear tooth sensors are used in various applications, such as in motor applications and in automotive applications to provide information to an engine control unit for ignition timing control, fuel management, and other operations.

In high precision applications such as automobiles, variations of accuracy in the detected motion of a target object can be problematic. Engine ignition timing, for example, depends on consistent detection accuracy. Detection accuracy can be adversely affected by variations in the magnetic field signal that are attributable to factors other than the passing target object. One source of such variations is air gap variations. Air gap refers to the distance between the magnetic field sensing element(s) and the target. Smaller air gaps result in larger peak-to-peak magnetic field signals and larger air gaps result in smaller peak-to-peak magnetic field signals. Although air gap is ideally fixed (i.e., constant) in a particular installation configuration, manufacturing tolerances can result in air gap variations. Furthermore, even after the sensor is installed, environmental and other factors such as wear over time can cause air gap variations in use.

SUMMARY

Described herein are magnetic field sensors that detect motion of a target with improved hysteresis at smaller peak-to-peak magnetic field signals when noise can be a significant factor in order to achieve increased operational air gap range by generating a threshold signal that varies with the peak-to-peak value of the magnetic field signal and in an incremental manner to avoid jumps in accuracy. In this way, the threshold signal level is optimized for air gap variations.

According to the disclosure, a magnetic field sensor for detecting motion of an object includes one or more magnetic field sensing elements configured to generate a magnetic field signal in response to a magnetic field associated with the motion of the object, a detector responsive to the magnetic field signal and to a threshold signal and configured to generate a comparison signal having edges occurring in response to a comparison of the magnetic field signal to the threshold signal, and a threshold generator. The threshold generator is configured to generate the threshold signal at a first level when a peak-to-peak value of the magnetic field signal is greater than a first predetermined value and at a second level when the peak-to-peak value of the magnetic field signal is less than a second predetermined value different than the first predetermined value.

Features may include one or more of the following individually or in combination with other features. The threshold generator may be further configured to incrementally vary the threshold signal between the first level and the second level when the peak-to-peak value of the magnetic field signal varies between the first predetermined value and the second predetermined value. The threshold generator may be further configured to generate the threshold signal at a third, variable level when the peak-to-peak value of the magnetic field signal is between the first predetermined value and the second predetermined value, wherein the third, variable level varies based at least in part of one or more of a positive peak value of the magnetic field signal, a negative peak value of the magnetic field signal, and an offset amount. The third, variable level of the threshold signal may be equal to the negative peak value of the magnetic field signal plus an offset amount when the magnetic field signal is rising and may be equal to the positive peak value of the magnetic field signal minus the offset amount when the magnetic field signal is falling. In embodiments, the first predetermined value of the peak-to-peak magnetic field signal may correspond to two times the offset amount and the second predetermined value of the peak-to-peak magnetic field signal may correspond to the offset amount divided by a value of between approximately 0.6 and 0.8. The offset amount may be selected during manufacture of the magnetic field sensor. The first level and second level of the threshold signal may be respective percentages of the peak-to-peak magnetic field signal. For example, the first level of the threshold signal may correspond to approximately 50% of the peak-to-peak magnetic field signal and the second level of the threshold signal may correspond to approximately 60% to 80% of the peak-to-peak magnetic field signal when the magnetic field signal is rising and approximately 40% to 20% of the peak-to-peak magnetic field signal when the magnetic field signal is falling.

Also described is a method for detecting motion of an object with a magnetic field sensor, including generating a magnetic field signal with one or more magnetic field sensing elements, the magnetic field signal indicative of the motion of the object, generating a threshold signal at a first level when a peak-to-peak value of the magnetic field signal is greater than a first predetermined value and at a second level when the peak-to-peak value of the magnetic field signal is less than a second predetermined value different than the first predetermined value, and comparing the magnetic field signal to the threshold signal to generate a comparison signal having transitions occurring when the magnetic field signal crosses the threshold signal.

Features may include one or more of the following individually or in combination with other features. Generating the threshold signal may include incrementally varying the threshold signal between the first level and the second level when the peak-to-peak value of the magnetic field signal varies between the first and second predetermined values. The method may further include generating the threshold signal at a third, variable level when the peak-to-peak value of the magnetic field signal is between the first predetermined value and the second predetermined value, wherein the third, variable level varies based at least in part of one or more of a positive peak value of the magnetic field signal, a negative peak value of the magnetic field signal, and an offset amount. The third, variable level of the threshold signal may be equal to the negative peak value of the magnetic field signal plus an offset amount when the magnetic field signal is rising and may be equal to the positive peak value of the magnetic field signal minus the offset amount when the magnetic field signal is falling. In embodiments, the first predetermined value of the peak-to-peak magnetic field signal may correspond to two times the offset amount and the second predetermined value of the peak-to-peak magnetic field signal may correspond to the offset amount divided by a value of between approximately 0.6 and 0.8. The offset amount may be selected during manufacture of the magnetic field sensor. Generating the threshold signal at the first and second levels may include generating the threshold signal at respective percentages of the peak-to-peak magnetic field signal. For example, generating the threshold signal at the first level may include setting the threshold signal to approximately 50% of the peak-to-peak magnetic field signal and generating the threshold signal at the second level may include setting the threshold signal to approximately 60% to 80% of the peak-to-peak magnetic field signal when the magnetic field signal is rising and setting the threshold signal to approximately 40% to 20% of the peak-to-peak magnetic field signal when the magnetic field signal is falling.

According to a further aspect of the disclosure, a magnetic field sensor includes means for generating a magnetic field signal with one or more magnetic field sensing elements, the magnetic field signal indicative of motion of an object, means for generating a threshold signal at a first level when a peak-to-peak value of the magnetic field signal is greater than a first predetermined value, at a second level when the peak-to-peak value of the magnetic field signal is less than a second predetermined value different than the first predetermined value, and at a third, variable level when the peak-to-peak value of the magnetic field signal is between the first and second predetermined values, and means for generating a sensor output signal based on a comparison of the magnetic field signal to the threshold signal. In embodiments, the threshold generating means may be configured to generate the threshold signal at the third, variable level based on one or more of a positive peak value of the magnetic field signal, a negative peak value of the magnetic field signal, and an offset amount.

BRIEF DESCRIPTION OF THE DRAWINGS

The foregoing features of the disclosure, as well as the disclosure itself may be more fully understood from the following detailed description of the drawings, in which.

DETAILED DESCRIPTION

Before describing the present disclosure, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half-bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "processor" or "controller" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

It should be understood that a so-called comparator can be comprised of an analog comparator having a two state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Figure 1:
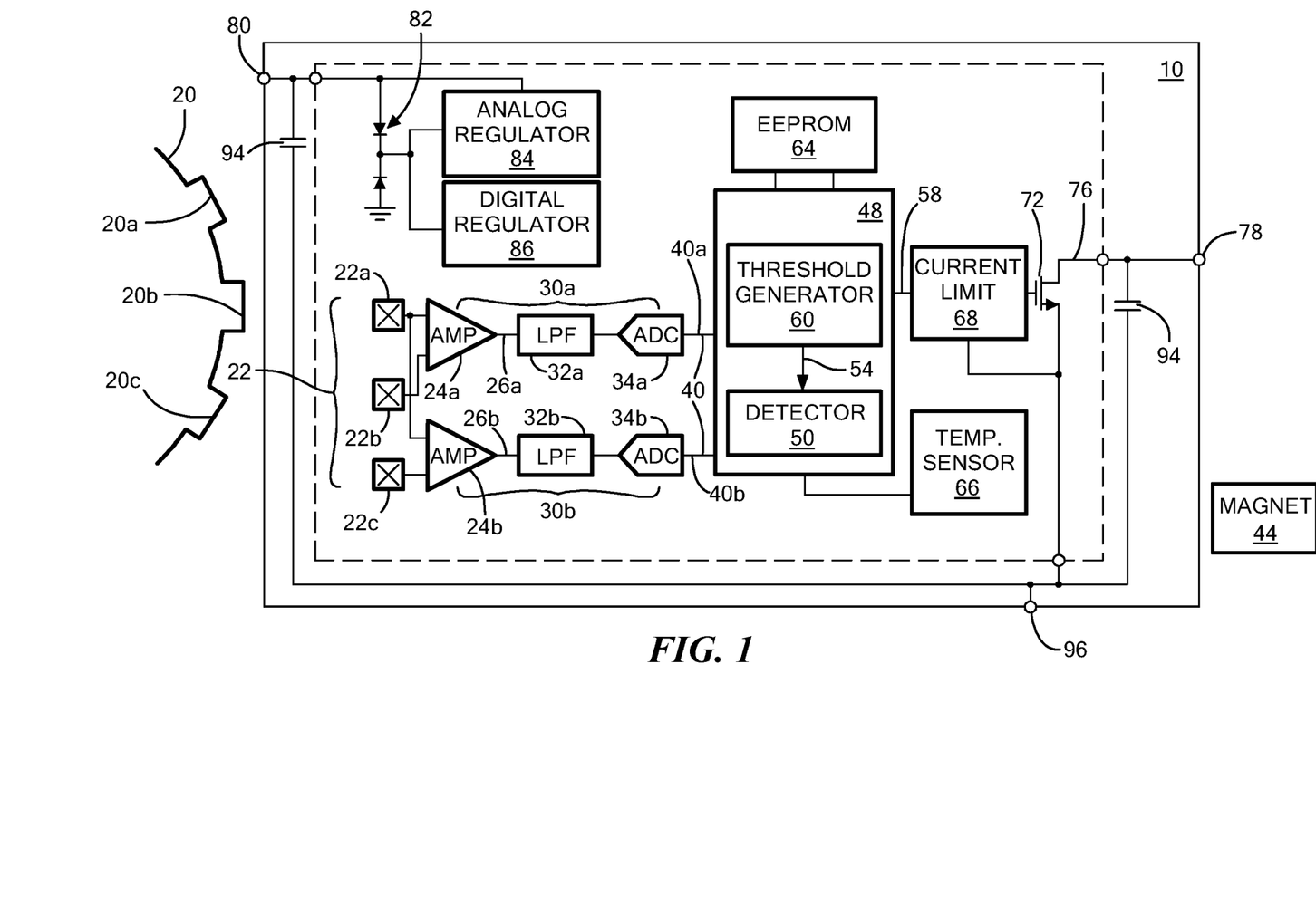
FIG. 1 is a block diagram of a magnetic field sensor according to the disclosure.

Referring to FIG. 1, a magnetic field sensor 10 capable of detecting motion (e.g., speed of motion and/or direction of motion) of an object 20 includes one or more magnetic field sensing elements 22 configured to generate a magnetic field signal in response to a magnetic field associated with the object and a detector 50 responsive to the magnetic field signal and to a threshold signal 54 and configured to generate a comparison signal 58 having edges (i.e., transitions, or state changes) occurring in response to a comparison of the magnetic field signal and the threshold signal and at a rate corresponding to a speed of motion of the object.

Generally, the level of threshold signal is optimized for an expected peak-to-peak magnetic field signal value in order to ensure that the magnetic field signal will reliably cross the threshold signal in order to thereby cause transitions in the detector output signal. For example, in some applications, setting the threshold signal at or near a mid-point of the expected peak-to-peak magnetic field signal (e.g., 50% of the peak-to-peak magnetic field signal) can achieve maximum switching accuracy. However, variations in the peak-to-peak magnetic field signal (as may occur due to air gap changes based on installation tolerances and/or environmental or other conditions in use) may prevent the magnetic field signal from crossing the threshold signal or cause erroneous crossings of the magnetic field signal with the threshold signal, thereby adversely affecting the accuracy of the detector output signal.

According to the disclosure, a threshold generator 60 is configured to generate the threshold signal 54 at a first level when a peak-to-peak value of the magnetic field signal is greater than a first predetermined value and at a second level when the peak-to-peak value of the magnetic field signal is less than a second predetermined value different than the first predetermined value. With this arrangement, the threshold signal level is tailored to the actual magnetic field signal in order to improve switching accuracy across a range of air gaps.

Furthermore, the threshold generator 60 incrementally varies the threshold signal between the first and second levels when the peak-to-peak magnetic field signal varies between the first and second predetermined values. Such incremental variation of the threshold signal 54 may be achieved by generating the threshold signal at a third, variable level when the peak-to-peak magnetic field signal is between the first and second predetermined values. The third, variable level of the threshold signal may vary based at least in part on one or more of a positive peak value of the magnetic field signal, a negative peak value of the magnetic field signal, and an offset amount. While the threshold signal 54 is described as being provided at different levels, it will be appreciated that the threshold signal 54 can include multiple discrete threshold signals, each provided at a respective different level. The described configuration and associated methods provide improved accuracy in the detector output signal 58 by eliminating missed switching (i.e., a failure of the signal to transition when it should) or additional erroneous switching over a range of air gaps.

The magnetic field sensor 10 includes one or more magnetic field sensing elements 22. In the example shown, the sensor 10 includes three sensing elements 22a, 22b, 22c arranged to generate differential magnetic field signals 26a, 26b in response to a magnetic field associated with the object 20 for processing by respective channels 30a, 30b. Object 20 may have features, e.g., gear teeth 20a, 20b, 20c of a ferromagnetic gear, as shown. The object 20 can be disposed, for example, upon a rotatable shaft. The object 20 may be coupled to an automobile wheel, steering shaft, or a camshaft, as a few examples.

Sensor 10 can include a permanent magnet 44 disposed within or proximate to the sensor package in a so-called "back-biased" arrangement. In a back-biased arrangement, the object, or target 20 is ferromagnetic and sensor 10 experiences changes of magnetic field generated by the permanent magnet 44 as the target 20 moves (e.g., rotates). It will be appreciated that, alternatively, target 20 can be a magnet that generates a magnetic field that varies as the target moves for detection by sensor 10, in which case the back-bias magnet 44 can be omitted. By way of one non-limiting example, target 20 can take the form of a so-called ring magnet having magnetic domains that are detected by the magnetic field sensor 10. Motion of the object 20 results in variations of the magnetic field sensed by the magnetic field sensing elements 22a-22c and, thus, result in variations of the magnetic field signals 26a, 26b generated by the magnetic field sensing elements.

Although the magnetic field sensing elements 22a-22c are depicted as a plurality of Hall effect elements, in some embodiments the magnetic field sensing element(s) can be, for example, provided as one or more magnetoresistance elements in the form of giant magnetoresistance (GMR) elements, anisotropic magnetoresistance (AMR) elements, tunneling magnetoresistance (TMR) elements, magnetic tunnel junction (MTJ) elements, or spin valve elements. It should be appreciated that the magnetic field sensing elements 22a-22c may take any form suitable for detecting motion of the object 20 by sensing a magnetic field affected by such motion.

Channels 30a, 30b represent signal paths (e.g., an analog, digital or mixed signal paths) coupled to receive the respective magnetic field signal 26a, 26b and configured to generate a respective signal (e.g., digital magnetic field signals 40a, 40b) representative of the respective magnetic field signal 26a, 26b. Illustrated channel signal paths 30a, 30b each include an amplifier 24a, 24b, a filter 32a, 32b, and an analog-to-digital converter (ADC) 34a, 34b.

The magnetic field sensor 10 further includes a controller, or processor 48 that is coupled to receive the digital signals 40a, 40b and signals from a temperature sensor 66 and one or more memory devices (e.g., EEPROMs) 64. Controller 48 is configured to generate a detector output signal 58 indicative of one or both of a speed of motion of the object 20 or a direction of motion of the object 20.

Detector 50 is configured to compare one, both, or some combination of digital magnetic field signals 40a, 40b to the threshold signal 54 in order to generate detector output signal 58 having edges occurring in response to the comparison. For simplicity, magnetic field signals 40a, 40b are referred to herein collectively as magnetic field signal 40 which signal can represent one or both of the digital signals 40a, 40b and the detector 50 is described as comparing the magnetic field signal 40 to the threshold signal 54. However, it will be appreciated that in some embodiments, each signal 40a, 40b is compared to the threshold signal 54 and the resulting respective comparison signals both can be provided to circuits or systems outside of the sensor 10, in some embodiments only one of signals 40a, 40b is compared to the threshold signal 54, and in some embodiments, a mathematical combination of signals 40a, 40b is compared to the threshold signal 54. The detector output signal 58 is generally a square-wave signal having edges, or transitions occurring at a rate indicative of the speed of motion (e.g., rotation) of the object 20. The magnetic field signal 40 crossing the threshold signal 54 in a first direction (e.g., in a rising direction, or with a positive slope) as may correspond to an operate point, Bop, causes a detector output signal transition to a first state. The magnetic field signal 40 crossing the threshold signal 54 in a second direction (e.g., a falling direction, or with a negative slope) as may correspond to a release point, $B_{RP}$, causes a detector output signal transition to a second state.

Direction of motion of the target 20 can be determined based on detection of a phase relationship of the channel signals 40a, 40b or their respective resulting comparison signals. In other words, when signal 40a leads signal 40b, the target 20 can be determined to be rotating in a first direction and a change in the phase relationship whereby signal 40b leads signal 40a can indicate a change in the target motion direction to a second, opposite direction.

During a startup, or power on mode of operation of the sensor, detector 50 may operate as a so-called TPOS detector in which the magnetic field signals 40 is compared to a startup threshold signal, as may be provided at a fixed level. Since the peak-to-peak value of the magnetic field signal 40 is a function of air gap, generally, the fixed, startup threshold is set relatively low in order to ensure output signal switching for a range of air gaps.

The power-on mode of operation extends for a time interval until the peak-to-peak value of magnetic field signal 40 (i.e., the magnetic field signal magnitude) reaches a level (e.g., a minimum Gauss threshold) sufficient to permit a more accurate threshold generation scheme to be employed in a running mode of operation in order to thereby provide a more accurate detector output signal 58.

Once the sensor 10 enters the running mode of operation, the detector 50 operates in the manner of a so-called peak-to-peak percentage detector, in which the threshold signal 54 is provided as a percentage of the peak-to-peak value of the magnetic field signal 40. To this end, sensor 10 includes a peak-to-peak detector to detect a peak-to-peak value of the magnetic field signal 40 and generate a detected peak-to-peak value indicative of the peak-to-peak value of the magnetic field signal. It will be appreciated that the peak-to-peak detector can be incorporated into the controller 48 as part of, or separate from the detector 50 or the threshold generator 60 as non-limiting examples.

In some applications, the running mode threshold signal level is selected to be at 50% of the peak-to-peak magnetic field signal. A threshold signal at approximately 50% of the peak-to-peak magnetic field signal can be advantageous since this mid-point level generally coincides with the magnetic field signal region with the greatest slope because the typical magnetic field signal is sinusoidal in nature, such as in crank or crankshaft applications for example.

Detector 50 may operate with hysteresis, such that once the magnetic field signal 40 crosses the nominal threshold level (e.g., 50% of the peak-to-peak magnetic field signal 40), the next switch point does not occur until the magnetic field signal exceeds the hysteresis level. As one non-limiting example, in an embodiment in which the threshold signal 54 used by the detector 50 has a nominal level at 50% of the peak-to-peak magnetic field signal 40, a +hysteresis level corresponds to +10% of the 50% level, and a −hysteresis level corresponds to −10% of the 50% level, the detector output signal 58 may transition to a first state when the magnetic field signal 40 crosses 50% of the peak-to-peak magnetic field signal 40 and may not transition to a second state until the magnetic field signal first crosses 55% of the peak-to-peak magnetic field signal and then returns to cross 50% of the peak-to-peak magnetic field signal, thereby triggering another switch point. In this way, hysteresis is provided to avoid false switching based on signal noise.

It will be appreciated that while the detector 50 is described above as operating in one manner during the power on stage of operation and in a different manner during the running mode, such operation can alternatively be achieved by separate detectors/detector units within the controller 48. If the startup and running mode operations are implemented by separate units, a multiplexer can select the TPOS detector output signal or the running mode detector output signal to provide the detector output signal 58 based on the operational stage of the sensor.

According to the disclosure, during the running mode of operation, threshold generator 60 provides the threshold signal 54 at a first level when a peak-to-peak value of the magnetic field signal 40 is greater than a first predetermined value and at a second level when the peak-to-peak value of the magnetic field signal is less than a second predetermined value that is different than the first predetermined value. Stated differently, the threshold signal 54 can include multiple threshold signals 208, 218 220 and the detector 50 can determine which such threshold signal to use for comparison based on the peak-to-peak value of the magnetic field signal. The first and second predetermined peak-to-peak magnetic field signal values thus correspond to transition points for changing the threshold signal level.

In general, the first and second levels of the threshold signal 54 are selected to optimize switch point accuracy (or switch point consistency) based on the available signal shape and SNR (signal-to-noise ratio) for a given peak-to-peak or air gap while also extending the operational air gap range by changing the thresholds to increase hysteresis. For example, the first threshold signal level can be approximately 50% of the peak-to-peak value of the magnetic field signal. A typical range for the second threshold signal level can be approximately 60% to 80% of the peak-to-peak value of the magnetic field signal when the magnetic field signal is rising and approximately 40% to 20% of the peak-to-peak value of the magnetic field signal when the magnetic field signal is falling. For example, the second threshold signal level can be 70% of the peak-to-peak value of the magnetic field signal when the magnetic field signal is rising and can be 30% of the peak-to-peak value of the magnetic field signal when the magnetic field signal is falling.

The first and second threshold signal levels can be determined during manufacture and/or can be programmable and/or user selectable. For example, EEPROMs 44 can store threshold signal level options and/or other programmable sensor parameters.

Figure 2:
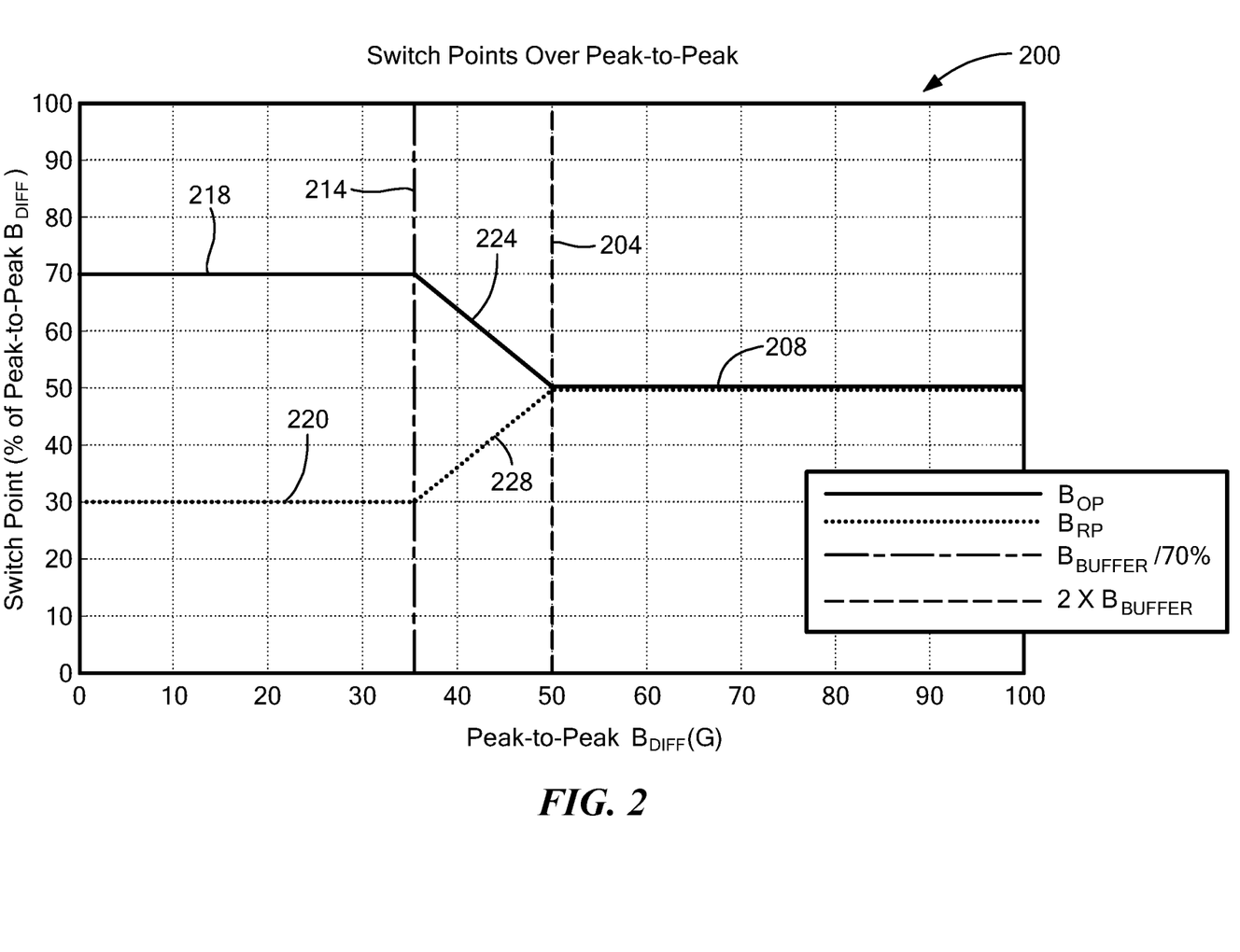
FIG. 2 is a plot illustrating threshold signal levels used by the magnetic field sensor of FIG. 1 as a function of example peak-to-peak magnetic field signal values.

Referring also to FIG. 2, a plot 200 illustrates the threshold signal level (represented along the vertical axis in units of percentage of the peak-to-peak magnetic field signal value) with respect to the peak-to-peak value of the magnetic field signal $B_{DIFF}$ (represented along the horizontal axis in units of Gauss). Magnetic field signal $B_{DIFF}$ may be the same as or similar to one or both of the magnetic field signals 40a, 40b (FIG. 1). In the illustrated example, when the peak-to-peak value of the magnetic field signal is greater than a first predetermined value labelled 204, the threshold signal 54 is at a level of 50% of the peak-to-peak value of the magnetic field signal as labelled 208. And when the peak-to-peak value of the magnetic field signal is less than a second predetermined value labelled 214, the threshold signal 54 is at a level of 30% or 70% of the peak-to-peak magnetic field signal as labelled 218, 220, depending on whether the magnetic field signal is rising or falling.

Various schemes are possible to select the first and second predetermined peak-to-peak magnetic field signal values 204, 214 (i.e., the transition points for changing the threshold signal level). In general, the first and second predetermined values 204, 214 of the peak-to-peak magnetic field signal are selected based on factors such as expected signal to noise levels, expected magnetic field magnitudes, target profile, and/or operating frequency. The first and second predetermined values 204, 214 can be determined during manufacture and/or can be programmable and/or user selectable and/or dynamically determined (i.e., "learned"). For example, EEPROMs 44 can store first and second predetermined value options. As a non-limiting example, the first predetermined value 204 can correspond to two times an offset amount and the second predetermined value 214 can correspond to the offset amount divided by a value of between approximately 0.6 and 0.8. In an example, the second predetermined value 214 can correspond to the offset amount divided by 0.7. The offset amount $B_{BUFFER}$ can be selected during manufacture based on various sensor and application parameters, again such as expected signal to noise levels, expected magnetic field magnitudes, target profile, and/or operating frequency In an example embodiment, the offset amount $B_{BUFFER}$ is 25 Gauss. Thus, the first predetermined value 204 corresponds to 50 Gauss and the second predetermined value 214 corresponds to 35 Gauss, as shown.

Threshold generator 60 is configured to vary the threshold signal 54 between the first level 208 and the second level (here levels 218, 220) when the peak-to-peak value of the magnetic field signal varies between the first predetermined value 204 and the second predetermined value 214, in an incremental fashion as shown. In the example embodiment, the incremental variation of the threshold signal 54 is achieved by generating the threshold signal at a third, variable level 224, 228 when the peak-to-peak magnetic field signal is between the first predetermined value 204 and the second predetermined value 214. Stated differently, the threshold signal 54 can include multiple threshold signals 208, 218, 220, 224, and 228 and the detector 50 can determine which such threshold signal to use for comparison based on the peak-to-peak value of the magnetic field signal. The third, variable level 224, 228 can vary based at least in part of one or more of a positive peak value of the magnetic field signal (herein PPEAK), a negative peak value of the magnetic field signal (herein NPEAK), and the offset amount ($B_{BUFFER}$). To this end, the sensor 10 can include a peak detector (e.g., as may include one or more digital to analog converters or DACs, such as a positive DAC or PDAC to track positive peaks and a negative DAC or NDAC to track negative peaks of the magnetic field signal). As a non-limiting example, the third, variable threshold signal level can be given by PPEAK−$B_{BUFFER}$ or NPEAK+$B_{BUFFER}$ depending on whether the magnetic field signal is rising or falling. By incremental, it is meant that the threshold signal is varied in small enough increments to provide a smooth threshold signal variation, thereby preventing sudden jumps that could adversely affect switching accuracy.

The detector output signal 58 can be coupled to a current limit circuit 68, which circuit drives an output driver 72 in order to generate a sensor output signal 76 at an output connection, or pin 78 of the sensor. It will be appreciated that while sensor 10 is shown to have an output connection 78, some sensors provide an output signal on the power and ground connections in a so-called two wire configuration. The sensor output signal 76 can be provided in various formats including, but not limited to PWM format, Single Edge Nibble Transmission (SENT) format, a Serial Peripheral Interface (SPI) format, a Local Interconnect Network (LIN) format, a CAN (Controller Area Network) format, an Inter-Integrated Circuit (I²C) format. In addition to speed and/or direction information, the sensor output signal 76 can include diagnostic information.

The sensor 10 can be provided in the form of an integrated circuit (IC) and can receive power at an input connection, or pin 80 that has an electromagnetic protection circuit 82 and is coupled to one or more on-chip regulators, such as the illustrated regulator 84 that generates a regulated voltage for powering analog circuitry of the sensor and regulator 86 that generates a regulated voltage for powering digital circuitry of the sensor. The IC can include a semiconductor die 90 on which much of the sensor circuitry is formed and one or more bypass capacitors 94 for coupling output and power pins 78, 80 to a ground connection, or pin 96, as shown.

Controller 48 can further implement various signal conditioning and compensation, as may be performed on the magnetic field signal 40 prior to comparison by detector 50. For example, temperature compensation can be implemented based on information from temperature sensor 66. Offset and gain adjustment can be performed based on programmable parameters such as gain correction coefficients and offset correction coefficients as may be stored in EEPROM 64.

While the magnetic field sensor 10 may be provided in the illustrated form of an IC with an analog front end portion and a digital portion, it will be appreciated that the particular delineation of which circuit functions are implemented in an analog fashion or with digital circuitry and signals can be varied. Further, some of the illustrated circuit functions can be implemented on an integrated circuit sensor 10 and other circuitry and functionality can be implemented on separate circuits (e.g., additional substrates within the same integrated circuit package, or additional integrated circuit packages, and/or on circuit boards).

Figure 3:
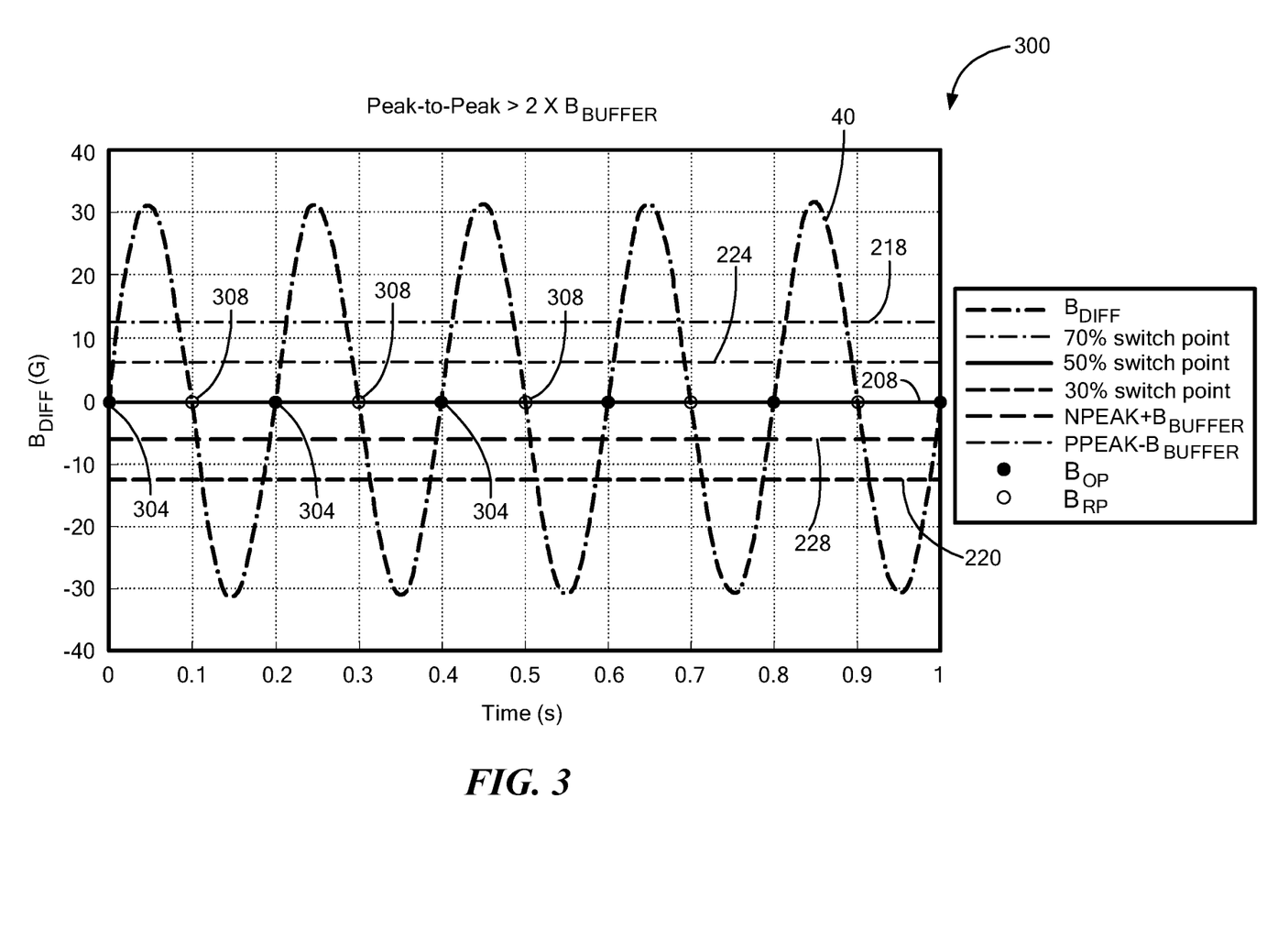
FIGS. 3, 3A, 3B, 3C, and 3D show example waveforms associated with the magnetic field sensor of FIG. 1 for different peak-to-peak magnetic field signal values.
Figure 3A:
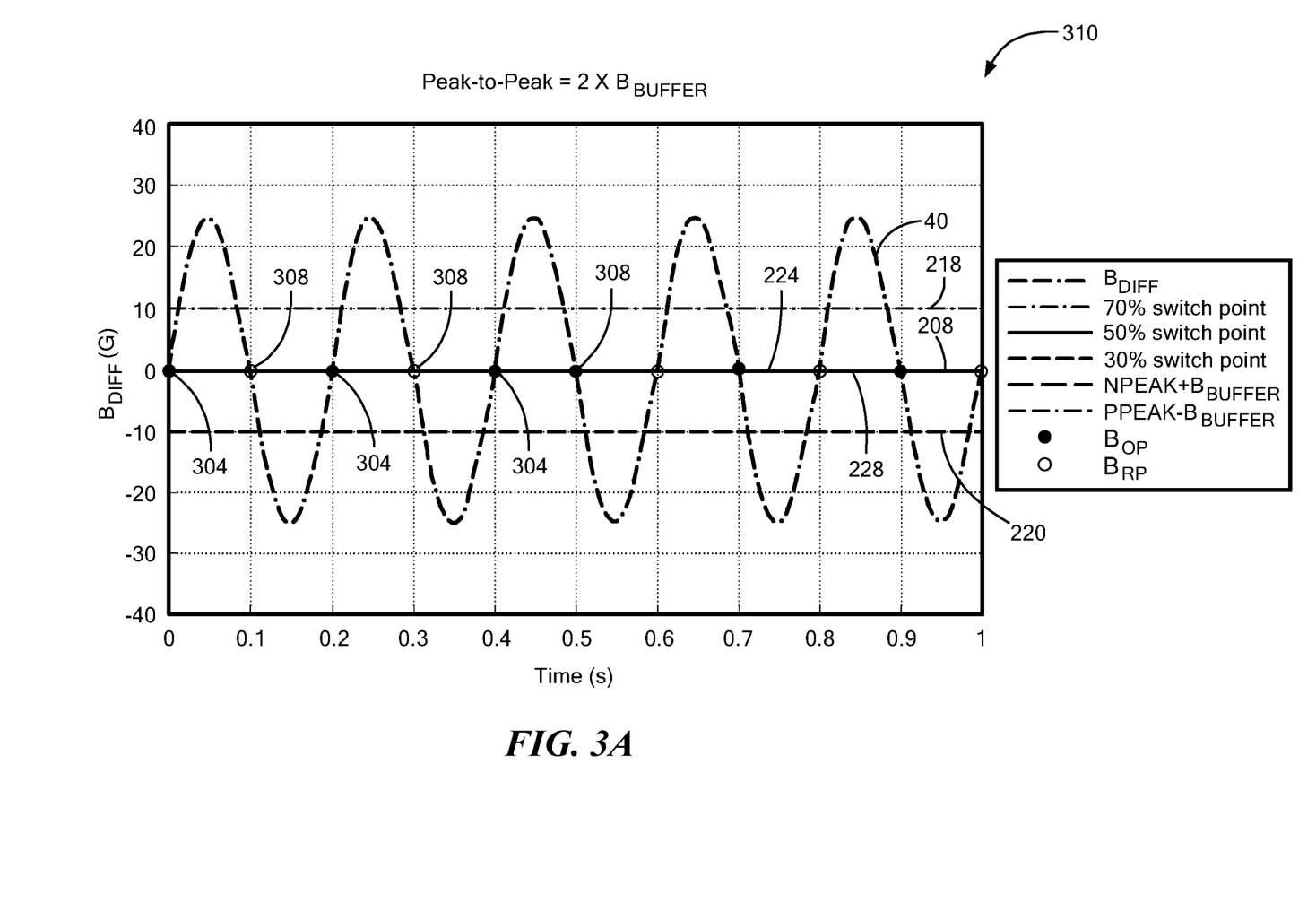
Figure 3B:
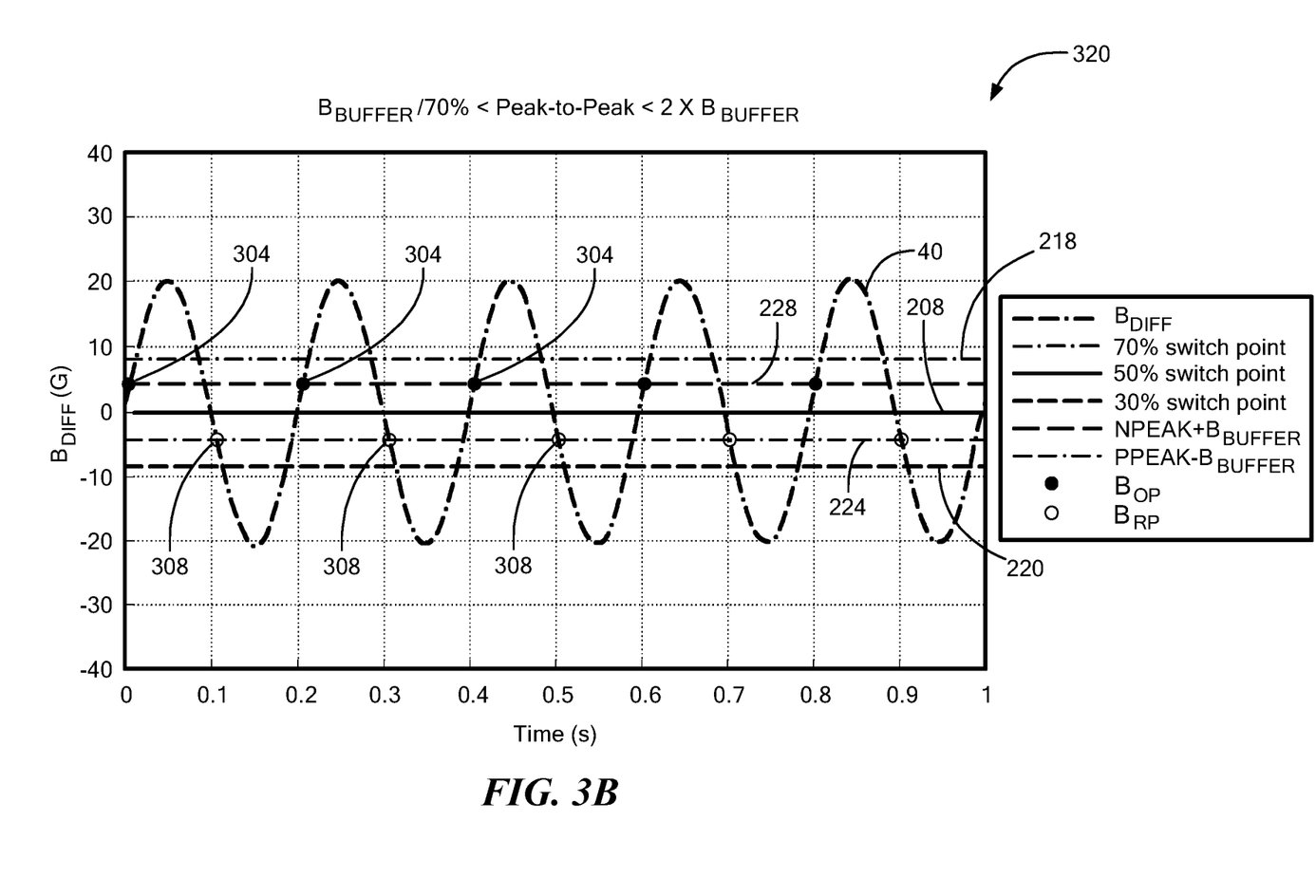
Figure 3C:
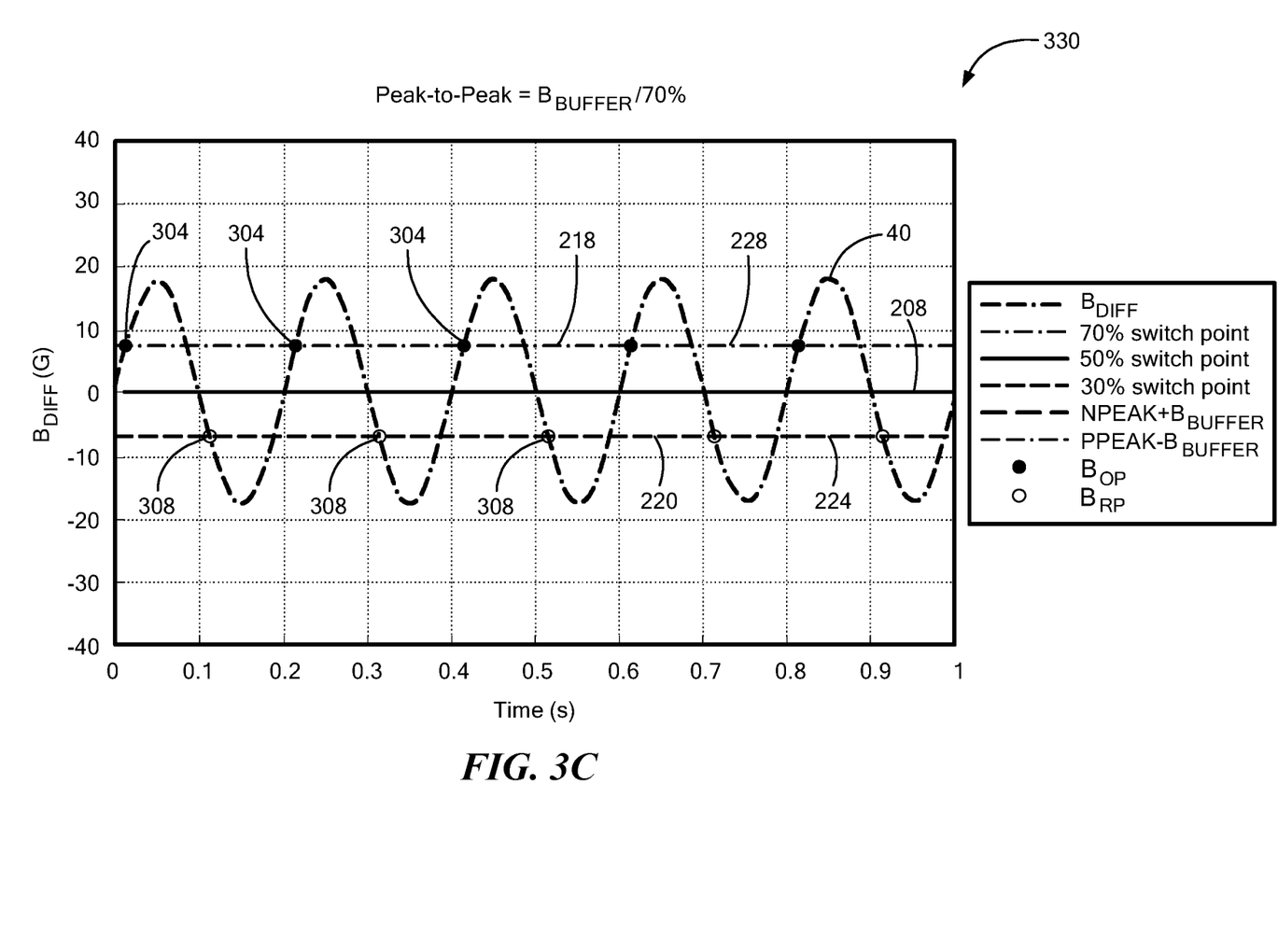
Figure 3D:
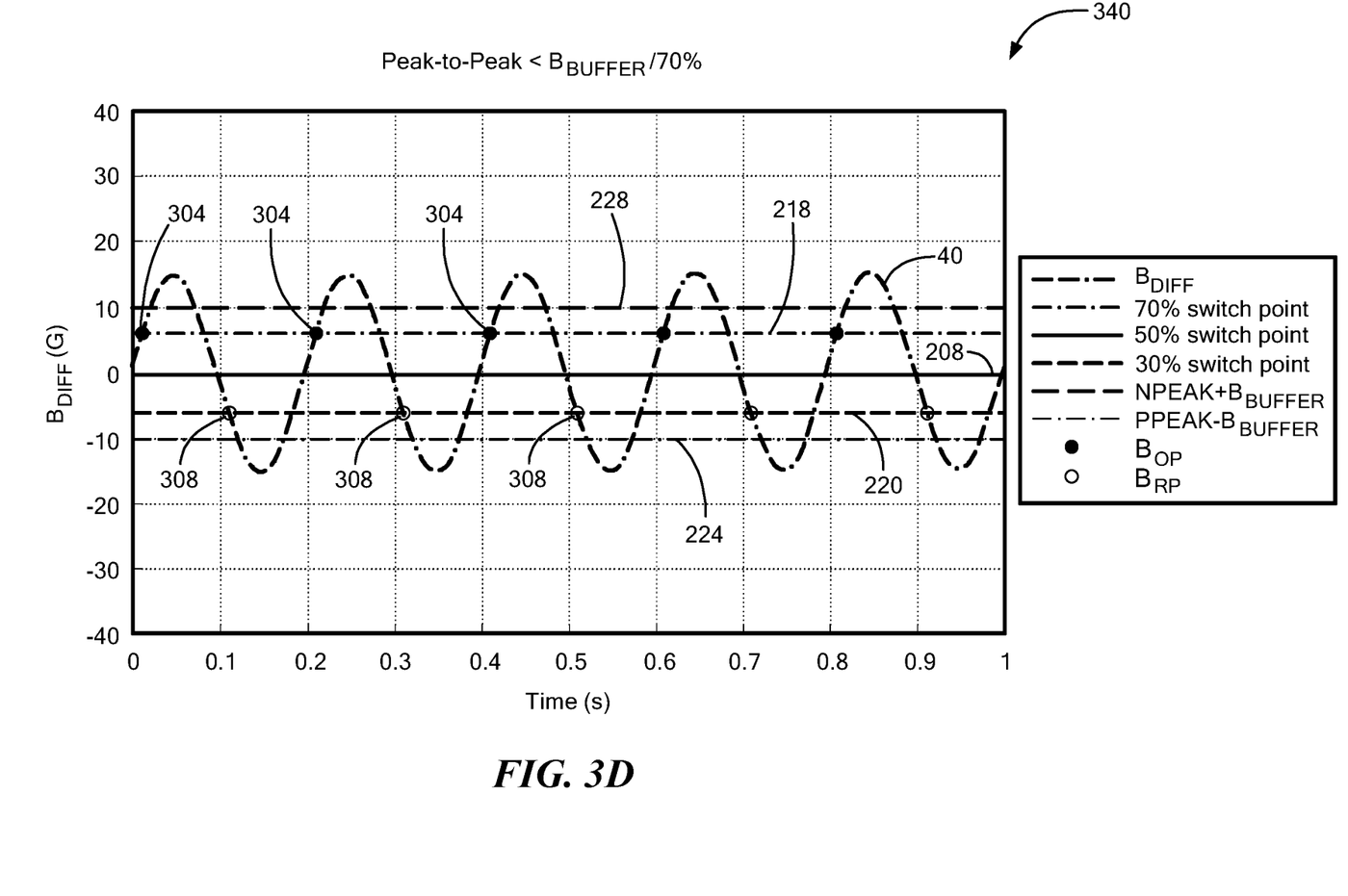

Referring to FIGS. 3-3D, example plots 300, 310, 320, 330, 340 of magnetic field signal 40 are shown to illustrate generation and adjustment of the threshold signals to which it is compared by the detector 50. In each such plot 300, 310, 320, 330, 340 of respective FIGS. 3, 3A, 3B, 3C, and 3D, the vertical axis illustrates the peak-to-peak magnetic field signal value in units of Gauss and the horizontal axis represents time in units of seconds. The different plots 300, 310, 320, 330, 340 illustrate different peak-to-peak magnetic field signal values, the resulting threshold signal levels, and specifically show which threshold signal level the magnetic field signal 40 is compared to in order to generate the detector output signal. The transitions points for changing the threshold signal level are those shown in the example of FIG. 2 (i.e., 204, 214)

In the plot 300 of FIG. 3, magnetic field signal 40 has a peak-to-peak value on the order of 65 Gauss. The first threshold signal level 208 is here shown to be 50% of the peak-to-peak magnetic field signal level. The second threshold signal level (and here two such levels) 218, 220 are here provided at 70% and 30% of the peak-to-peak magnetic field signal, respectively. And the third, variable threshold signal level (and here two such levels) 224, 228 are here provided at PPEAK−$B_{BUFFER}$ and NPEAK+$B_{BUFFER}$, respectively.

Because the peak-to-peak magnetic field signal 40 is greater than the first predetermined value (i.e., 204 in FIG. 2, such as two times $B_{BUFFER}$ or 50 Gauss), the first threshold signal level 208 (i.e., 50% of the peak-to-peak magnetic field signal) is used for comparison by the detector 50 in order to generate the detector output signal. Accordingly, detector output signal switch points occur when the magnetic field signal 40 crosses the threshold signal level 208, with switch points 304 corresponding to operate points Bop and switch points 308 corresponding to release points $B_{RP}$.

In the plot 310 of FIG. 3A, magnetic field signal 40 has a peak-to-peak value of 50 Gauss which corresponds to the first predetermined peak-to-peak magnetic field signal value 204 (FIG. 2). Thus, under this magnetic field signal condition, the first threshold signal level 208 is the equal to the third, variable threshold signal level (i.e., PPEAK−$B_{BUFFER}$ and NPEAK+$B_{BUFFER}$), as shown. In other words, this illustrated condition corresponds to a threshold signal transition point. Detector output signal switch points occur when the magnetic field signal 40 crosses the threshold signal level 208 (and equal threshold signal levels 224, 228), with switch points 304 corresponding to operate points Bop and switch points 308 corresponding to release points $B_{RP}$.

In the plot 320 of FIG. 3B, magnetic field signal 40 has a peak-to-peak value on the order of 40 Gauss. In other words, the peak-to-peak magnetic field signal value is between the first and second predetermined values 204, 214 (FIG. 2). Adjustment of the third threshold signal level (here levels 224, 228), as may correspond to PPEAK−$B_{BUFFER}$ and NPEAK+$B_{BUFFER}$, results in level 228 now being higher than level 224, as shown.

Because the peak-to-peak magnetic field signal value is between the first and second predetermined values 204, 214 (FIG. 2), the third threshold signal level (here levels 224, 228) are used for comparison by the detector 50 in order to generate the detector output signal. Accordingly, detector output signal switch points occur when the magnetic field signal 40 crosses the threshold signal level 224, 228, with switch points 304 corresponding to operate points Bop when signal 40 crosses threshold level 228 and switch points 308 corresponding to release points $B_{RP}$ when signal 40 crosses threshold level 224.

In the plot 330 of FIG. 3C, magnetic field signal 40 has a peak-to-peak value on the order of 35 Gauss. In other words, the peak-to-peak magnetic field signal value corresponds to the first predetermined value 214 (FIG. 2). Thus, under this magnetic field signal condition, the third threshold signal levels 228, 224 correspond to the second threshold signal levels 218, 220, respectively. In other words, this illustrated condition corresponds to a threshold signal transition point. Because the peak-to-peak magnetic field signal value corresponds to the first predetermined value 214 (FIG. 2), the third threshold signal levels 224, 228 (and equal threshold signal levels 220, 218) are used for comparison by the detector 50 in order to generate the detector output signal. Accordingly, detector output signal switch points occur when the magnetic field signal 40 crosses the threshold signal level 224, 228, with switch points 304 corresponding to operate points Bop and switch points 308 corresponding to release points $B_{RP}$.

The plot 340 of FIG. 3D illustrates a magnetic field signal 40 at a peak-to-peak value on the order of 30 Gauss which is less than the first predetermined value 214 (FIG. 2). Thus, under this condition, the first threshold signal level (here levels 218, 220) are used for comparison by the detector 50 in order to generate the detector output signal. Accordingly, detector output signal switch points occur when the magnetic field signal 40 crosses the threshold signal level 218, 220, with switch points 304 corresponding to operate points Bop and switch points 308 corresponding to release points $B_{RP}$.

Consideration of FIGS. 3-3D reveals that, depending on the peak-to-peak value of the magnetic field signal 40, the threshold signal 54 used by the detector 50 for comparison in order to generate the detector output signal is either a threshold signal at the first threshold level 208, a threshold signal at the second threshold level 218, 220, or a threshold signal at the third, variable level 224, 228, with each such threshold level being a function of the peak-to-peak magnetic field signal level. Furthermore, the third, variable threshold signal level varies incrementally between the first and second threshold signal levels and does in the manner shown in the plots of FIGS. 3-3D. The incremental variations of the threshold signal advantageously prevents jumps in the threshold signal level that could adversely affect output signal switching accuracy.

Figure 4:
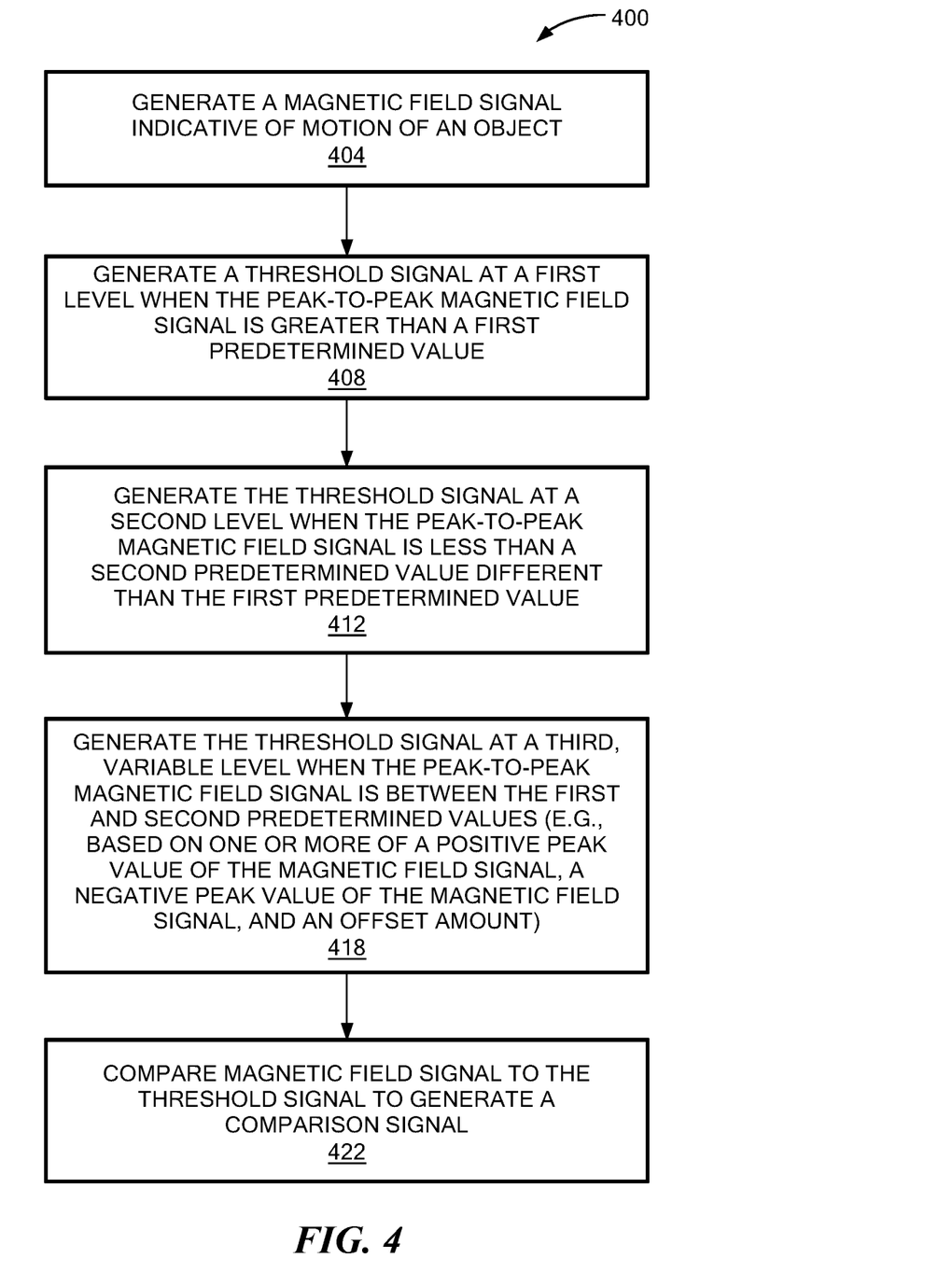
FIG. 4 is a flow diagram illustrating threshold adjustment in the magnetic field sensor of FIG. 1.

Referring also to FIG. 4, a flow diagram illustrates a method 400 of threshold signal generation and adjustment in order to accommodate various peak-to-peak magnetic field signal values with improved accuracy. At block 404, a magnetic field signal is generated in response to a magnetic field associated with an object. For example, a magnetic field generated by permanent magnet 44 that is affected by movement (e.g., rotation) of target 20 can cause sensing elements 22 to generate magnetic field signals.

At block 408, a threshold signal 54 is generated as may be provided by threshold generator 60. The threshold signal 54 (which may include one or more threshold signals) is at a first level when the value of the peak-to-peak magnetic field signal is greater than a first predetermined value. For example, as shown in FIGS. 2 and 3, when the peak-to-peak magnetic field signal 40 is greater than first predetermined value 204, the threshold signal can be at a first level 208, such as at 50% of the peak-to-peak magnetic field signal.

At block 412, when the peak-to-peak magnetic field signal 40 is less than a second predetermined value 214 that is different than the first predetermined value 204, the threshold signal 54 is provided at a second level. For example, as shown in FIGS. 2 and 3D, when the peak-to-peak magnetic field signal 40 is less than second predetermined value 214, the threshold signal can be at a second level, such as between 20% and 40% or between 80% and 60% of the peak-to-peak magnetic field signal 220, 218, depending on the slope of the magnetic field signal. As one non-limiting example the second level of the threshold signal can be at 30% of the peak-to-peak magnetic field signal or at 70% of peak-to-peak magnetic field signal, depending on the polarity of the slope of the magnetic field signal.

At block 418, when the peak-to-peak magnetic field signal 40 is between the first and second predetermined values 204, 214, the threshold signal 54 is provided at a third, variable level. For example, as shown in FIGS. 2 and 3B, when the peak-to-peak magnetic field signal 40 is between the first and second predetermined values 204, 214, the threshold signal can be at a third, variable level based on one or more of a positive peak value PPEAK of the magnetic field signal, a negative peak value NPEAK of the magnetic field signal, and an offset amount $B_{BUFFER}$. In the above-described example, the third, variable level of the threshold signal can be at PPEAK–$B_{BUFFER}$ 224 and NPEAK+$B_{BUFFER}$ 228, depending on the slope of the magnetic field signal.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used.

For example, where particular numerical values or ranges of values are used, it will be appreciated by those of ordinary skill in the art that they are intended as non-limiting examples only and that other values and/or ranges of values may be used to suit particular applications and requirements. Furthermore, where particular relationships between signal values and other values (e.g., PPEAK, NPEAK, $B_{BUFFER}$) are used to establish transition points (e.g., 204, 214 in FIG. 2) between threshold signal levels, it will be appreciated by those of ordinary skill in the art that they are intended as non-limiting examples only and that other signal values and/or other values may be used to suit particular applications and requirements. Furthermore, where particular threshold signal levels are described (e.g., 70%, 50%, 30% of the peak-to-peak magnetic field signal), it will be appreciated by those of ordinary skill in the art that they are intended as non-limiting examples only and that other threshold signal levels are possible to suit particular applications and requirements.

Accordingly, it is submitted that the scope of the patent should not be limited to the described embodiments but rather should be limited only by the spirit and scope of the following claims.

What is claimed is:

1. A magnetic field sensor for detecting motion of an object, comprising:
one or more magnetic field sensing elements configured to generate a magnetic field signal in response to a magnetic field associated with the motion of the object;
a detector responsive to the magnetic field signal and to a threshold signal and configured to generate a comparison signal having edges occurring in response to a comparison of the magnetic field signal to the threshold signal; and
a threshold generator configured to generate the threshold signal at a first level when a peak-to-peak value of the magnetic field signal is greater than a first predetermined value and at a second level when the peak-to-peak value of the magnetic field signal is less than a second predetermined value different than the first predetermined value, wherein the first level and second level of the threshold signal are each different respective percentages of the peak-to-peak value of the magnetic field signal.

2. The magnetic field sensor of claim 1, wherein the threshold generator is further configured to incrementally vary the threshold signal between the first level and the second level when the peak-to-peak value of the magnetic field signal varies between the first predetermined value and the second predetermined value.

3. The magnetic field sensor of claim 1, wherein the threshold generator is further configured to generate the threshold signal at a third, variable level when the peak-to-peak value of the magnetic field signal is between the first predetermined value and the second predetermined value, wherein the third, variable level varies based at least in part of one or more of a positive peak value of the magnetic field signal, a negative peak value of the magnetic field signal, and an offset amount.

4. The magnetic field sensor of claim 3, wherein the third, variable level of the threshold signal is equal to the negative peak value of the magnetic field signal plus an offset amount when the magnetic field signal is rising and is equal to the positive peak value of the magnetic field signal minus the offset amount when the magnetic field signal is falling.

5. The magnetic field sensor of claim 3, wherein the first predetermined value of the peak-to-peak magnetic field signal corresponds to two times the offset amount and wherein the second predetermined value of the peak-to-peak magnetic field signal corresponds to the offset amount divided by a value of between approximately 0.6 and 0.8.

6. The magnetic field sensor of claim 3, wherein the offset amount is selected during manufacture of the magnetic field sensor.

7. The magnetic field sensor of claim 1, wherein the first level of the threshold signal corresponds to approximately 50% of the peak-to-peak value of the magnetic field signal.

8. The magnetic field sensor of claim 1, wherein the second level of the threshold signal corresponds to approximately 60% to 80% of the peak-to-peak value of the magnetic field signal when the magnetic field signal is rising and approximately 40% to 20% of the peak-to-peak value of the magnetic field signal when the magnetic field signal is falling.

9. A method for detecting motion of an object with a magnetic field sensor, comprising:
   generating a magnetic field signal with one or more magnetic field sensing elements, the magnetic field signal indicative of the motion of the object;
   generating a threshold signal at a first level when a peak-to-peak value of the magnetic field signal is greater than a first predetermined value and at a second level when the peak-to-peak value of the magnetic field signal is less than a second predetermined value different than the first predetermined value, wherein the first level and second level of the threshold signal are each different respective percentages of the peak-to-peak value of the magnetic field signal; and
   comparing the magnetic field signal to the threshold signal to generate a comparison signal having transitions occurring when the magnetic field signal crosses the threshold signal.

10. The method of claim 9, wherein generating the threshold signal comprises incrementally varying the threshold signal between the first level and the second level when the peak-to-peak value of the magnetic field signal varies between the first and second predetermined values.

11. The method of claim 9, further comprising generating the threshold signal at a third, variable level when the peak-to-peak value of the magnetic field signal is between the first predetermined value and the second predetermined value, wherein the third, variable level varies based at least in part of one or more of a positive peak value of the magnetic field signal, a negative peak value of the magnetic field signal, and an offset amount.

12. The method of claim 11, wherein the third, variable level of the threshold signal is equal to the negative peak value of the magnetic field signal plus an offset amount when the magnetic field signal is rising and is equal to the positive peak value of the magnetic field signal minus the offset amount when the magnetic field signal is falling.

13. The method of claim 11, wherein the first predetermined value of the peak-to-peak magnetic field signal corresponds to two times the offset amount and wherein the second predetermined value of the peak-to-peak magnetic field signal corresponds to the offset amount divided by a value of between approximately 0.6 and 0.8.

14. The method of claim 11, further comprising selecting the offset amount during manufacture of the magnetic field sensor.

15. The method of claim 9, wherein generating the threshold signal at the first level comprises setting the threshold signal to approximately 50% of the peak-to-peak value of the magnetic field signal.

16. The method of claim 9, wherein generating the threshold signal at the second level comprises setting the threshold signal to approximately 60% to 80% of the peak-to-peak value of the magnetic field signal when the magnetic field signal is rising and setting the threshold signal to approximately 40% to 20% of the peak-to-peak value of the magnetic field signal when the magnetic field signal is falling.

17. A magnetic field sensor, comprising:
   means for generating a magnetic field signal with one or more magnetic field sensing elements, the magnetic field signal indicative of motion of an object;
   means for generating a threshold signal at a first level when a peak-to-peak value of the magnetic field signal is greater than a first predetermined value, at a second level when the peak-to-peak value of the magnetic field signal is less than a second predetermined value different than the first predetermined value, and at a third, variable level when the peak-to-peak value of the magnetic field signal is between the first and second predetermined values, wherein the first level and second level of the threshold signal are each different respective percentages of the peak-to-peak value of the magnetic field signal; and
   means for generating a sensor output signal based on a comparison of the magnetic field signal to the threshold signal.

18. The magnetic field sensor of claim 17, wherein the threshold generating means is configured to generate the threshold signal at the third, variable level based on one or more of a positive peak value of the magnetic field signal, a negative peak value of the magnetic field signal, and an offset amount.

\* \* \* \* \*

UNITED STATES PATENT AND TRADEMARK OFFICE
CERTIFICATE OF CORRECTION

PATENT NO. : 11,454,521 B2
APPLICATION NO. : 17/060235
DATED : September 27, 2022
INVENTOR(S) : Philip Suyderhoud et al.

Page 1 of 1

It is certified that error appears in the above-identified patent and that said Letters Patent is hereby corrected as shown below:

In the Specification

Column 8, Line 6 delete "signals 40" and replace with --signal 40--.

Column 9, Line 35 delete ", EEPROMs 44" and replace with --, EEPROMs 64--.

Column 9, Line 66 delete ", EEPROMs 44" and replace with --, EEPROMs 64--.

Signed and Sealed this
Nineteenth Day of September, 2023

Katherine Kelly Vidal
*Director of the United States Patent and Trademark Office*